United States Patent [19]

Karim et al.

[11] 4,367,113

[45] * Jan. 4, 1983

[54] MULTICOMPONENT POLYMER COMPOSITIONS

[75] Inventors: Khalid A. Karim; Pallavoor R. Lakshmanan; James H. Rea, all of Houston, Tex.

[73] Assignee: Gulf Oil Corporation, Pittsburgh, Pa.

[*] Notice: The portion of the term of this patent subsequent to Jun. 29, 1999, has been disclaimed.

[21] Appl. No.: 278,762

[22] Filed: Jun. 29, 1981

[51] Int. Cl.$^3$ .................. C08G 93/00; C09J 5/00; B29F 3/10

[52] U.S. Cl. .................. 156/327; 264/171; 264/DIG. 57; 428/461; 428/483; 428/511; 428/514; 428/523; 428/702; 524/187; 524/271; 524/272; 524/77; 525/179; 525/221

[58] Field of Search .............. 428/461, 483, 511, 514, 428/523, 702; 156/327; 260/27 R, 27 EV; 264/171, DIG. 57; 525/179, 221; 524/187, 272

[56] References Cited

U.S. PATENT DOCUMENTS

| | | | |
|---|---|---|---|
| 3,249,570 | 5/1966 | Potts et al. | 525/221 |
| 3,264,272 | 8/1966 | Rees | 428/36 |
| 3,373,224 | 3/1968 | Mesrobian et al. | 525/179 |
| 3,485,785 | 12/1969 | Anspon et al. | 260/29.4 R |
| 3,553,178 | 1/1971 | Clampitt et al. | 260/96 |
| 3,600,468 | 8/1971 | Boehme | 525/221 |
| 3,970,626 | 7/1976 | Hurst et al. | 260/29.6 H |
| 4,078,014 | 3/1978 | Starkweather et al. | 525/179 |
| 4,152,387 | 5/1979 | Cloeren | 425/462 |

FOREIGN PATENT DOCUMENTS

| | | | |
|---|---|---|---|
| 53-5071733 | 11/1978 | Japan | 525/221 |
| 53-5090575 | 12/1978 | Japan | 525/179 |
| 54-5108432 | 2/1979 | Japan | 525/221 |
| 1183086 | 3/1970 | United Kingdom | 525/179 |

OTHER PUBLICATIONS

Kirk—Othmer Encyclopedia of Chemical Technology, 2nd Ed., vol. 17, pp. 475–508, (1968).

*Primary Examiner*—H. S. Cockeram
*Attorney, Agent, or Firm*—Richard L. Kelly

[57] ABSTRACT

Compatible blends of polymers are disclosed which contain (a) a high density ethylene polymer or an isotactic propylene polymer, (b) a copolymer of ethylene and an alkyl ester of acrylic or methacrylic acid or vinyl acetate, (c) an ionomer resin, and (d) a tackifying resin such as a terpene resin.

21 Claims, No Drawings

MULTICOMPONENT POLYMER COMPOSITIONS

BACKGROUND OF THE INVENTION (a) Field of the Invention

The invention relates to blends of thermoplastic resins. Each blend will contain a minimum of four components.

(b) Description of the Prior Art

While the prior art describes blends of thermoplastic resins containing two or more of the components employed in the compositions of the present invention, the prior art does not disclose the multicomponent compositions described and claimed herein.

SUMMARY OF THE INVENTION

The applicants have discovered novel blends of polymers consisting essentially of:
(a) An olefin polymer,
(b) An ethylene copolymer,
(c) An ionomer resin, and
(d) A tackifying resin.

The compositions have utility principally as hot melt adhesives and as laminating resins used in the manufacture of composite film constructions by coextrusion processes.

DETAILED DESCRIPTION OF THE INVENTION

The olefin polymer included in the compositions of the invention will be either a high density ethylene polymer or an isotactic propylene polymer or a mixture thereof. The high density ethylene polymer will have a density of at least about 0.95 and preferably at least about 0.96 gram/ml as determined by ASTM method D-1505-63T. The ethylene polymer will consist essentially of polymerized ethylene with any comonomer polymerized therewith being a $C_3$ or higher alpha-olefin such as propylene, butene-1, hexene-1, or the like. Such resins are commercially available from many sources. The propylene polymer can be essentially any isotactic propylene polymer of the type sold for conversion to film. Such polymers can be a propylene homopolymer, a random propylene-ethylene copolymer, a propylene-ethylene block copolymer, and the like. Frequently small amounts of an elastomer will be blended with the propylene polymer. The elastomer employed for this purpose can be of any type conventionally employed with such propylene polymers, including terpolymers of propylene, ethylene, and a nonconjugated diene such as hexadiene, dicyclopentadiene, and the like. The olefin polymer employed will be selected to have a molecular weight and melt flow properties such that the compositions of the invention can be extruded readily.

The ethylene copolymers included in the blends have polymerized therein about 70 to 90, preferably about 78-83, and more especially about 80 weight % of ethylene, with the balance of the copolymer being an alkyl ester of acrylic or methacrylic acid or vinyl acetate. The alkyl group of the acrylic or methacrylic acid ester may contain from about 1 to 18 carbon atoms, with the preferred esters being the methyl and the ethyl esters. The preferred ethylene copolymers will have melt indexes* in the range of about 0.1-100, preferably about 1-40, and more especially about 1.5-25**. Some grades of ethylene-vinyl acetate copolymers, as sold, are blended with small quantities of paraffin wax to lower the melt index. The melt indexes referred to above are values for the uncompounded resins. Such copolymers can be prepared by known methods as disclosed, for example, in U.S. Pat. No. 3,350,372. It is preferred practice to control both the alkyl acrylate or vinyl acetate content of the copolymer and the ratio of the olefin polymer and the ethylene copolymer, so that the alkyl acrylate or vinyl acetate moiety constitutes about 4-12 and preferably about 6-10 weight % of the total weight of the two polymers.

*As determined by ASTM 1238-70, Condition E.
**The vinyl acetate copolymers normally will have higher melt index values than the acrylate ester copolymers.

The ionomer resin included in the blends will be a metal salt of an ethylene-acid copolymer, specifically a copolymer of ethylene and acrylic or methacrylic acid having an acid content of about 1-10 mol %. The ethylene-acid copolymer, in addition to the polymerized ethylene and acid moiety, may contain up to about 10 mol % of additional polymerized monomer moieties such as vinyl acetate, alkyl acrylates, alkyl methacrylates, acrylamide, methacrylamide, and the like. The cation employed in the salt preferably is monovalent such as alkali metal ions, e.g., sodium and potassium ions. Certain polyvalent metal ions can be employed in certain circumstances, e.g., zinc ions. In most cases, it is preferred to employ the metal cation in an amount that is less than stoichiometrically equivalent to the carboxylic acid groups of the ethylene-acid copolymer. Where the preferred quantity of the metal cation is employed, the ionomers can be viewed as being terpolymers containing polymerized ethylene, a salt of the polymerized acid, and the free polymerized acid.

The composition of the ionomer, including its molecular weight, mol % acid content, and cation content, should be adjusted so that the ionomer has a high load melt index (ASTM 1238-70, Condition F) of at least about 1.0. It's feasible to employ ionomers having a normal load melt index (ASTM 1238-70, Condition E) as high as about 50. The preferred ionomer resins will have a normal load melt index in a range of about 1 to 5. Suitable ionomers can be prepared by methods reported in the prior art. See U.S. Pat. Nos. 3,264,272; 3,485,785; and 3,970,626. One method consists of preparing an ethylene-acrylic (or methacrylic) acid copolymer and reacting it with sodium hydroxide to convert the desired percentage of carboxylic acid groups to sodium carboxylate groups. Another method involves saponifying an ethylenealkyl acrylate (or methacrylate) copolymer with an aqueous sodium hydroxide solution to form a stable aqueous emulsion of the sodium salt of an ethylene-acrylic (or methacrylic) acid copolymer. Such emulsion can be coagulated with carbon dioxide as disclosed in U.S. Pat. No. 3,553,178 to recover the sodium salt in a solid form.

The tackifying resins employed in the compositions of the invention will be selected from the group consisting of:
(a) Terpene resins having a Ring and Ball softening point of about 10°-150° C.,*
(b) Aliphatic hydrocarbon resins having a Ring and Ball softening point of about 10°-135° C.*,
(c) Rosin esters having a Ring and Ball softening point of about 65°-140° C.,*
(d) Alpha-methylstyrene/vinyl toluene copolymers having a Ring and Ball softening point of about 75°-120° C.,*

(e) Polystyrene resins having a Ring and Ball softening point of about 25°–100° C.,*
(f) Terpene-phenolic resins having a Ring and Ball softening point of about 80°–135° C.,* and
(g) Rosin.

*All Ring and Ball softening points determined by ASTM E-28-58T.

The tackifying resins employed in the invention are known products available from commercial sources. The rosin tackifiers suitable for use are those described in the Kirk-Othmer *Encyclopedia of Chemical Technology*, Interscience Publishers, Second Edition, Volume 17, pages 475–509. These include not only the natural occurring rosins, but the chemically modified rosins obtained by hydrogenation, dehydrogenation, isomerization, dimerization, and the like.

The terpene resins employed typically will have a Ring and Ball softening point of about 10°–105° C. and preferably about 70°–120° C. Such resins generally are prepared by the polymerization of terpene hydrocarbons in the presence of Friedel-Crafts catalysts at moderately low temperatures; examples of commercially available resins of this type being the Nirez resins sold by the Reichhold Chemical Corp. and the Piccolyte S-10, S-25, S-70, S-85, S-100, S-115, S-125, and S-135 resins as sold by the Hercules Chemical Corp.

The aliphatic hydrocarbon resins employed will have a Ring and Ball softening point of about 10°–135° C. These resins are prepared by polymerization of monomers consisting primarily of 5 carbon atom olefins and diolefins; examples of commercially available resins of this type being Wing-Tack 95 as sold by the Goodyear Tire and Rubber Co. and the Sta-Tac resins sold by the Reichhold Chemical Corp.

The rosin esters employed are formed by esterifying a rosin acid with a di-, tri, or tetra-hydroxy aliphatic alcohol such as ethylene glycol, propylene glycol (either the 1,2 or the 1,3 isomer), glycerine, or pentaerythritol. The rosin acid employed will be any of the standard grades sold in commerce; the product sold under the trade designation ACINTOL R Type S being typical of acids satisfactory for use in the present invention. The typical rosin acids sold in commerce are obtained principally from tall oil and will have the following typical analysis:*

Rosin Acids—88–92%
Rosin Esters and Anhydrides—4–6%
Unsaponifiable Matter—2–6%
Fatty Acids—1–3%

*The presence of the minor components causes no difficulties in preparing the esters employed in the invention.

The rosin acids are mixtures of two principal types, the abietic types and the pimaric types. A typical distribution of individual acids found in commercial rosin acids is:

| Rosin Acid | Typical Analysis |
| --- | --- |
| Abietic Acid | 34% |
| Dehydroabietic Acid | 24% |
| Palustric Acid | 9% |
| Isopimaric Acid | 6% |
| Dihydroabietic Acid | 5% |
| Pimaric Acid | 5% |
| Neoabietic Acid | 3% |

Suitable rosin esters which are commercially available include the glyceryl ester sold under the designation Foral 85 and the pentaerythritol ester sold under the designation Foral 105.

The alpha-methylstyrene/vinyl toluene copolymers are known products, certain of which are sold under the Piccotex trade designation. Similarly the low molecular weight polystyrene resins are known products, certain of which are sold under the trade designation Piccolastic. The terpene-phenolic resins are known materials described at pages 183 and 184 of the text *Organic Coating Technology*, Vol. I, by Henry Fleming Payne, John Wiley & Sons, Inc., 1954, Library of Congress Catalog Card Number 54-5971, which description is incorporated herein by reference. Resins of this type are sold under the trade designation Piccofyn.

For an expanded list of suitable tackifying resins, see CA Report No. 37 published in October 1971 by the Technical Association Of The Pulp and Paper Industry and titled "Raw Materials for Hot Melts," which descriptions are incorporated herein by reference.

The proportions of the components to be included in the compositions will vary somewhat depending upon the intended end use application of the composition. As earlier noted, the olefin polymer and the ethylene copolymer preferably will be employed in a ratio such that the alkyl acrylate (or methacrylate) or vinyl acetate moiety will constitute about 4–12 and more especially about 6–10 weight % of the two polymers. For each 100 parts of combined weight of the olefin polymer and the ethylene copolymer, the ionomer resin and the tackifying resin* will be employed in the combined amount of about 15–200, preferably about 20–100, and more especially about 30–75 parts. It is preferred to employ the tackifying resin in a proportion somewhat higher than the ionomer resin. It is generally preferred not to employ the tackifying resin in excess of 150 parts per 100 parts of combined weight of the olefin polymer and the ethylene copolymer, and more especially not in excess of 100 parts per 100 parts of said polymers.

*When two or more tackifying resins are included in a composition, the total concentration of the tackifying resins will be considered to be a single component for purposes of calculating composition percentages and ratios.

The above ranges are applicable for most end use applications presently visualized, particularly where good adhesive properties are desired. It will be recognized that optimum properties for other end use applications may vary somewhat, particularly if the ratio of the olefin polymer and the ethylene copolymer and/or the composition of the ionomer resin differ from the compositions subsequently exemplified. In addition, it will be recognized that several variables are present in the disclosed 4 component compositions; these being inter alia, the melt index of the olefin polymer and the ethylene copolymer and the chemical variants in the ionomer resin and the tackifying resin. For this reason, optimum properties for any combination of components will be found at different composition ranges within the ranges discussed supra. Optimum compositions for any such system can be established with a minimum of experimental work for the system of interest.

In addition to the components discussed above, the compositions of the invention may contain additional components which do not alter their functional utility for intended end use applications. For most applications, it is desirable to include an antioxidant in the compositions. Antioxidants customarily employed with ethylene polymers are suitable. Where the compositions are to be used as a hot melt adhesive, certain wax-like materials may be included to lower the compositions' melting point and/or melt viscosity. Where used, such diluents may be used in amounts of up to about 30 parts per 100 parts of the total adhesive formulation. Suitable diluents include: (1) low molecular weight, liquid polybutylene in the molecular weight range of from about 600 to 3000; (2) petroleum waxes such as a paraffin wax having a melting point of from about 130°–165° F.; and a microcrystalline wax having a melting point of from about 140°–200° F.; the latter melting points being determined by ASTM method D 127-60; (3) polyethylene waxes having a softening point of from about 80°–100° C., and a hardness value, as determined by ASTM method D-1321, of from about 60–120; (4) mineral oil; and (5) synthetic waxes made by polymerizing carbon monoxide and hydrogen, such as Fischer-Tropsch wax.

A desirable characteristic of the compositions of the invention is that they are quite transparent and have good adhesion to a number of important materials, including wood, paper, aluminum foil, copper foil, ethylene homopolymers of both the low density and high density types, isotactic propylene polymers, ethylene-vinyl alcohol copolymers (obtained by hydrolysis of ethylene-vinyl acetate copolymers) and polyethylene terephthalate polyesters. Accordingly, the compositions are well suited for use in the manufacture of laminated sheet constructions by conventional laminating techniques.

They also are well suited for use in the manufacture of composite thermoplastic film constructions by coextrusion techniques of the type shown in U.S. Pat. No. 4,152,387. They also can be employed as hot melt adhesives to form strong bonds between surfaces of the type noted supra.

In addition to their favorable physical properties, the compositions of the invention have a favorable combination of electrical properties measured by dissipation factor, dielectric constant and dielectric strength. Accordingly, they can be used as an adhesive to bond polyethylene terephthalate film to copper foil to prepare articles useful in the electronics industry.

The following examples are set forth to illustrate more clearly the principle and practice of the invention to those skilled in the art. Where parts or percentages are mentioned, they are parts or percentages on a weight basis unless otherwise noted. The polymeric materials employed in the examples are described below.

Olefin Polymer A was a commercially available high density ethylene polymer having a density of about 0.955 gram/ml and a melt index of about 0.2.

Olfein Polymer B was a commercially available isotactic propylene polymer having a density of about 0.902 gram/ml and a melt index of about 12.0.

Ethylene Copolymer A was a commercially available ethylene-methyl acrylate copolymer which contained 20 weight % of methyl acrylate and had a melt index of about 2.4.

Ionomer Resin A was a commercial product sold under the designation Surlyn 1601. This product is reported by the manufacturer to be a sodium salt of an ethylene-methyacrylic acid copolymer having a melt index of about 1.3.

Tackifying Resin A was a commercial product sold under the designation Foral 85. This product is reported by the manufacturer to be a glycerine ester of highly hydrogenated rosin acids and has a melting point of about 80° C.

Tackifying Resin B was a commercial product sold under the designation Piccolyte S-70. This product is reported by the manufacturer to be a terpene resin having a R&BSP* of 70° C.

Tackifying Resin C was a commercial product sold under the designation Zonatac 105. This product is reported by the manufacturer to be a terpene resin having a R&BSP* of 105° C.

Tackifying Resin D was a commercial product sold under the designation Statac 100. This product is reported by the manufacturer to be an aliphatic hydrocarbon resin having a R&BSP* of 100° C.

Tackifying Resin E was a commercial product sold under the designation Escorez 5300. This product is reported by the manufacturer to be an aliphatic hydrocarbon resin having a R&BSP* of about 105° C.

Tackifying Resin F was a commercial product sold under the designation Adtac B-10. This product is reported by the manufacturer to be an aliphatic hydrocarbon resin having a R&BSP* of about 10° C.

Tackifying Resin G was a commercial product sold under the designation Piccofyn 115. This product is reported by the manufacturer to be a terpene-phenolic resin having a R&BSP* of 115° C.

Tackifying Resin H was a commercial product sold under the designation Piccotex 75. This product is reported by the manufacturer to be an alpha-methylstyrene/vinyl toluene copolymer having a R&BSP* of about 75° C.

Tackifying Resin J was a commercial product sold under the designation Piccolastic A-75. This product is reported by the manufacturer to be a polystyrene resin having a R&BSP* of about 75° C.

*R&BSP=Ring & Ball Softening Point.

EXAMPLE 1

Part A

A blend was prepared from 70 parts of Olefin Polymer A, 30 parts of Ethylene Copolymer A, 15 parts of Ionomer Resin A, and 38 parts of Tackifying Resin A. The blend was prepared by fluxing the materials for 20 minutes in a Brabender Plasticorder operated at approximately 130° C. and 40 rpm. The blend subsequently was ground to a particle size that passed through an 8-mesh screen.

Part B

The adhesion of the blend to polyethylene terephthalate film (Mylar) was measured. The powdered blend was distributed over a section of one sheet of the polyester film (5 mil thick) and a second sheet of polyester film was laid on the assembly. The assembly then was pressed for 10 minutes at 300° F. under an applied pressure of 2500 lbs/in$^2$. Specimens 1" wide were cut through both the bonded and the unbonded (adhesive free area) sections of the laminate. The peel strength of the laminated section was measured by pulling the laminate apart in an Instron machine operated at a cross head speed of 2"/minute. The peel strength was 2.2 lbs/inch.

Part C

Part B was repeated employing sheets of aluminum foil in lieu of the polyethylene terephthalate film. The peel strength of the assembly was 5.7 lbs/inch.

EXAMPLE 2

Example 1, Part A, was repeated except that Olefin Polymer B was employed in lieu of Olefin Polymer A.

When tested to bond Mylar sheets, the peel strength of the assembly was 1.3 lbs/inch. When tested with aluminum foil, the peel strength of the assembly was 3.4 lbs/inch.

EXAMPLES 3-10

A series of compositions identical to that described in Example 1, Part A, were prepared except that the tackifying resin was changed in these formulations. Table I shows the tackifying resin employed and the peel strengths for assemblies prepared from two sheets of Mylar film or two sheets of aluminum foil. The method of preparing the assemblies was as described in Example 1 and the reported peel strength values are in lbs/inch.

TABLE I

| Example No. | Tackifying Resin | Peel Strength Mylar/Mylar | Peel Strength Al Foil/Al Foil |
| --- | --- | --- | --- |
| 3 | B | 2.1 | 3.0 |
| 4 | C | 1.9 | 3.8 |
| 5 | D | — | 3.9 |
| 6 | E | — | 3.1 |
| 7 | F | 1.5 | 2.6 |
| 8 | G | — | 1.8 |
| 9 | H | — | 2.7 |
| 10 | J | — | 1.9 |

EXAMPLES 11-16

A series of compositions identical to that described in Example 2 were prepared except that the tackifying resin employed was varied. The resins were tested in preparing assemblies from two sheets of aluminum foil employing the method described in Example 1. The compositions employed and the peel strength values are shown in Table II.

TABLE II

| Example No. | Tackifying Resin | Peel Strength Al Foil/Al Foil |
| --- | --- | --- |
| 11 | B | 1.9 |
| 12 | C | 1.8 |
| 13 | D | 3.5 |
| 14 | E | 1.9 |
| 15 | G | 1.3 |
| 16 | H | 1.6 |

What is claimed:

1. A compatible blend of polymers consisting essentially of:
   (a) an olefin polymer,
   (b) an ethylene copolymer,
   (c) an ionomer resin, and
   (d) a tackifying resin;

said olefin polymer being a polymer comprising polymerized ethylene with any comonomer polymerized therewith being a $C_3$ or higher alpha-olefin and having a density of at least about 0.95 gram/ml or an isotactic propylene polymer; said ethylene copolymer having polymerized therein about 70 to 90 weight % of ethylene and the balance an alkyl ester of acrylic or methacrylic acid or vinyl acetate; said ionomer resin having a high load melt index of at least about 1.0 and a normal load melt index of up to about 50, and being a metal salt of an ethylene-acid copolymer which is a copolymer of ethylene and acrylic or methacrylic acid having an acid content of about 1-10 mol %; and said tackifying resin being selected from the group consisting of:

(a) terpene resins having a Ring and Ball softening point of about 10°-150° C.,
(b) aliphatic hydrocarbon resins having a Ring and Ball softening point of about 10°-135° C.,
(c) rosin esters having a Ring and Ball softening point of about 65°-140° C.,
(d) alpha-methylstyrene/vinyl toluene copolymers having a Ring and Ball softening point of about 75°-120° C.,
(e) polystyrene resins having a Ring and Ball softening point of about 25°-100° C., and
(f) terpene-phenolic resins having a Ring and Ball softening point of about 80°-135° C.; and
(g) rosin, said composition containing the olefin polymer and the ethylene copolymer in the combined amount of 100 parts by weight and containing the ionomer resin and the tackifying resin in the combined amount of about 15-200 parts by weight; and the olefin polymer and the ethylene copolymer being present in proportions such that the alkyl ester or vinyl acetate moiety of the ethylene copolymer constitutes about 4-12 weight % of the total weight of said two polymers.

2. A composition of claim 1 in which the tackifying resin is present in an amount in excess of the ionomer resin.

3. A composition of claim 2 in which the tackifying resin is present in an amount not in excess of about 100 parts per weight per 100 parts of combined weight of said olefin polymer and said ethylene copolymer.

4. A composition of claim 2 in which the ethylene copolymer is a copolymer of ethylene and methyl acrylate.

5. A composition of claim 2 in which the ethylene copolymer is a copolymer of ethylene and ethyl acrylate.

6. A composition of claim 2 in which the ethylene copolymer is a copolymer of ethylene and vinyl acetate.

7. A composition of claim 2 in which the ionomer resin is a partial alkali metal salt of the ethylene-acid copolymer.

8. A composition of claim 1, 2, 3, 4, 5, 6, or 7 in which the olefin polymer is a polymer comprising polymerized ethylene with any comonomer polymerized therewith being a $C_3$ or higher alpha-olefin and having a density of at least about 0.95 gram/ml.

9. A composition of claim 1, 2, 3, 4, 5, 6, or 7 in which the olefin polymer is an isotactic propylene polymer.

10. A laminated sheet construction containing first and third laminae intimately fusion-bonded to a second lamina; each of said first and third laminae sheet being independently fabricated from paper, aluminum, copper, an ethylene homopolymer, an ethylene-vinyl alcohol copolymer, an isotactic propylene polymer, or a polyethylene terephthalate polyester; and said second lamina being fabricated from a polymer composition of claim 1.

11. In an adhesive method for bonding together two articles having surfaces of paper, aluminum, copper, and ethylene homopolymer, an ethylene-vinyl alcohol copolymer, an isotactic propylene polymer or a polyethylene terephthalate polyester in which a hot melt adhesive heated above its melting point is placed between the surfaces to be bonded together, said surfaces are assembled together and the assembly is cooled to ambient temperature to solidify such adhesive; the improvement which consists essentially of employing as the hot melt adhesive a polymer composition of claim 1.

12. In a coextrusion process for preparing a composite polymer film construction having polymers in the two surface layers which are fusion-bonded to each other by an intermediate polymer layer in which three polymer streams are fed into three channels of a film die, and the three polymer streams flow into the film die and are extruded to form an extrudate in which the three polymer streams form a film having three fusion-bonded layers; the improvement which consists of employing an ethylene homopolymer, an ethylene-vinyl alcohol copolymer, an isotactic propylene polymer, or a polyethylene terephthalate polyester as the polymer to form each of the two surface layers and employing a polymer composition of claim 1 and to form the intermediate polymer layer.

13. A composition of claim 1 in which the ionomer resin and the tackifying resin are present in the combined amount of about 20-100 parts by weight per 100 parts of combined weight of the olefin polymer and the ethylene copolymer.

14. A composition of claim 13 in which the ionomer resin and the tackifying resin are present in the combined amount of about 30-75 parts by weight.

15. A composition of claim 1, 2, or 14 in which the tackifying resin is a terpene resin.

16. A composition of claim 1, 2, or 14 in which the tackifying resin is an aliphatic hydrocarbon resin.

17. A composition of claim 1, 2, or 14 in which the tackifying resin is a rosin ester.

18. A composition of claim 1, 2, or 14 in which the tackifying resin is an alpha-methylstyrene/vinyl toluene copolymer.

19. A composition of claim 1, 2, or 14 in which the tackifying resin is a polystyrene resin.

20. A composition of claim 1, 2, or 14 in which the tackifying resin is a terpene-phenolic resin.

21. A composition of claim 1, 2, or 14 in which the tackifying resin is rosin.

* * * * *